C. N. & S. N. TRUMP.
Scroll-Sawing Machine.

No. 162,588. Patented April 27, 1875.

WITNESSES:
Gustav Dieterich
A. F. Terry

INVENTOR
C. N. Trump
S. N. Trump
BY
ATTORNEYS.

UNITED STATES PATENT OFFICE.

CHARLES N. TRUMP AND SAMUEL N. TRUMP, OF WILMINGTON, DELAWARE.

IMPROVEMENT IN SCROLL-SAWING MACHINES.

Specification forming part of Letters Patent No. 162,588, dated April 27, 1875; application filed January 18, 1875.

*To all whom it may concern:*

Be it known that we, CHARLES N. TRUMP and SAMUEL N. TRUMP, of Wilmington, in the county of New Castle and State of Delaware, have invented a new and useful Improvement in Scroll-Sawing Machines, of which the following is a specification:

The invention will first be fully described, and then pointed out in the claims.

Figure 1:
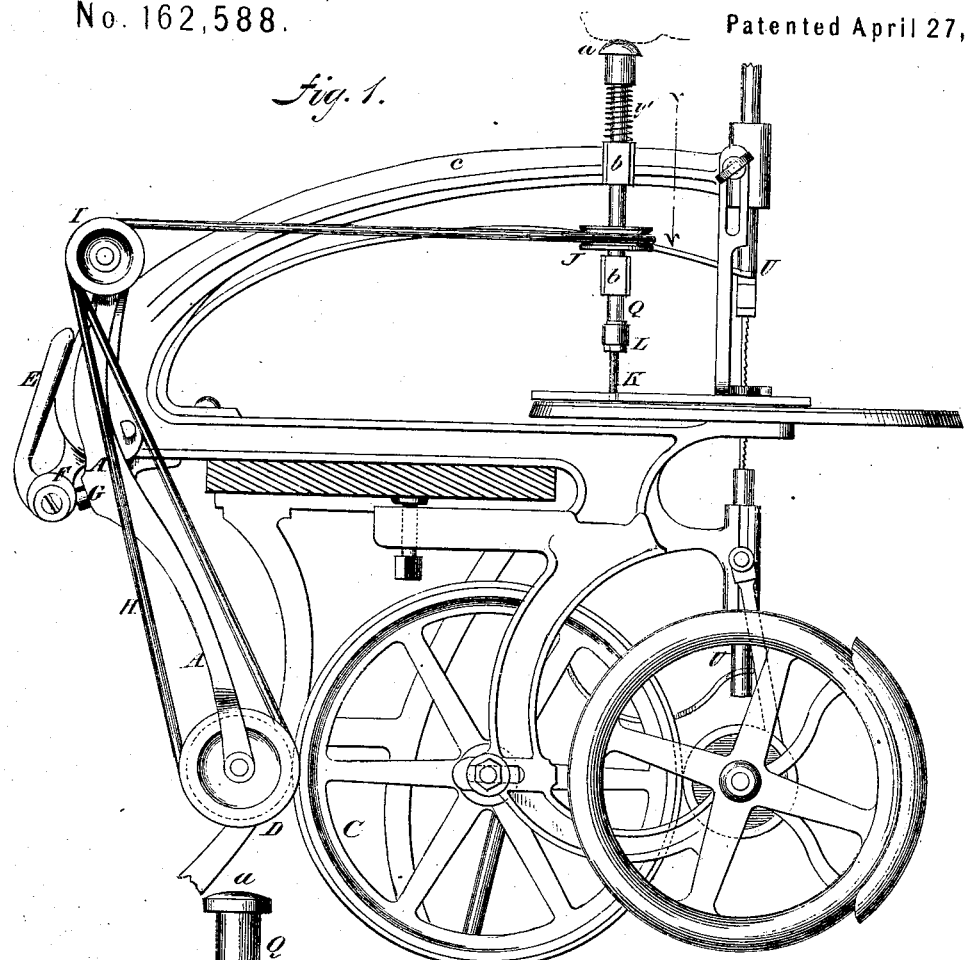
Figures 2, 3:
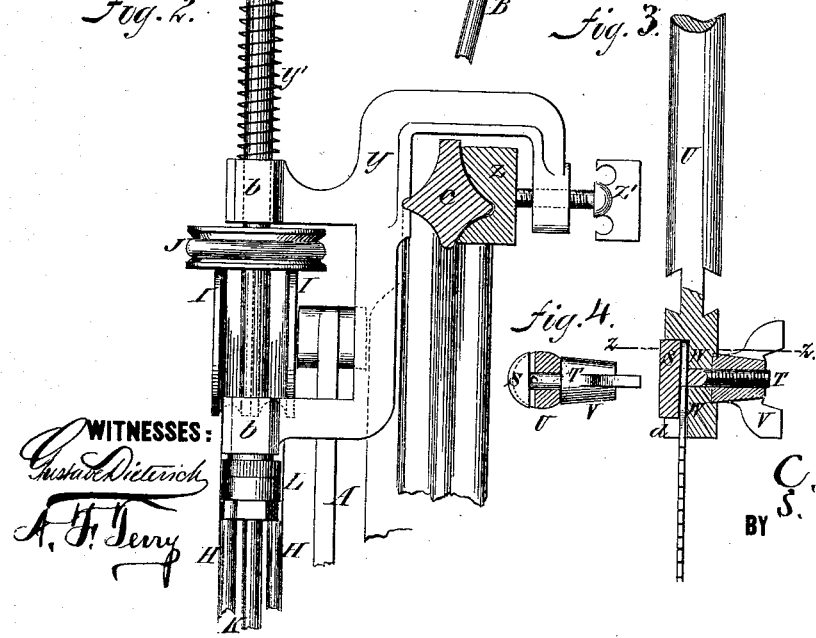
Figure 4:
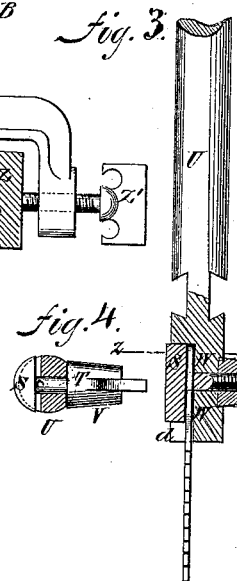

Figure 1 is a sectional side elevation of the machine, showing the boring attachment arranged ready for use. Fig. 2 is a vertical section looking to the left from the line $v\ v$, Fig. 1, showing the boring device and manner of attaching the mandrel to the arm of the saw. Fig. 3 is a sectional detail of the saw-clamp, showing its construction. Fig. 4 is a cross-section of Fig. 3, taken on the line $z\ z$.

Similar letters of reference indicate corresponding parts.

A is a piece of iron or other metal, which is fitted to and fastened on the shoulder of the arm of the machine by means of a set-screw on the opposite side. The saw is driven by foot or other power applied, by means of the pitman-rod B, to the friction-wheel C. The boring device is driven by the same friction-wheel, by means of the friction-pulley D on the end of the piece A. E is a lever connected with the piece A, to which an eccentric, F, is attached, which eccentric bears on the pin G, and throws the friction-pulley in contact with the friction-wheel C. When the lever is thrown back the pulley is drawn back from the wheel by the driving-band H of the boring-bit. This band passes around a cord-pulley on the side of the friction-pulley D, and from thence upward and over the double pulley I at the other end of the piece A, and from thence around the pulley J of the boring-mandrel. K is the boring-bit, and L is the chuck by which the bit is held. S represents the saw-clamp. T is a screw, which passes through the round bars U, having a thumb-nut, V. There are holes through the screws, through which the ends of the saw pass. The saw rests against the straight faces W, so that when the clamp S is drawn up its whole inner surface bears on and clamps the saw, as seen in the drawing.

The boring-mandrel is supported on the arm of the saw by means of the bracket Y, which is fastened by means of the block Z and set-screw Z'. The mandrel is supported above the bracket Y by means of a spiral spring, Y', and is depressed (in boring) by bearing on the end $a$. The arms $b\ b$ of the bracket form boxes for the mandrel. $c$ is the arm which supports the saw. In the side of the saw-mandrel is a slot, $d$, which allows the saw to be introduced from the side, and not from the bottom end, of the mandrel, as is usual.

This boring attachment is essential to the gig-saw, as in sawing various ornamental patterns and designs it is necessary to start the saw in new and separate holes to carry out the design.

Having thus described our invention, we claim as new and desire to secure by Letters Patent—

1. The combination of clamp S, screw T, bar U, having faces W, and nut V, as and for the purpose set forth.

2. The lever E and eccentric F, in combination with piece A, having pin G, pulley D, and wheel C, all as and for the purpose specified.

CHAS. N. TRUMP.
    SAML. N. TRUMP.

Witnesses:
 T. J. SULLIVAN,
 L. McC. McPHERSON.